(12) United States Patent
Tang

(10) Patent No.: US 11,696,219 B2
(45) Date of Patent: Jul. 4, 2023

(54) DATA TRANSMISSION METHOD, TERMINAL APPARATUS, AND NETWORK APPARATUS

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 57 days.

(21) Appl. No.: 16/605,323

(22) PCT Filed: Apr. 28, 2017

(86) PCT No.: PCT/CN2017/082413
§ 371 (c)(1),
(2) Date: Oct. 15, 2019

(87) PCT Pub. No.: WO2018/195911
PCT Pub. Date: Nov. 1, 2018

(65) Prior Publication Data
US 2021/0144625 A1      May 13, 2021

(51) Int. Cl.
*H04W 76/27*      (2018.01)
*H04W 92/10*      (2009.01)
(Continued)

(52) U.S. Cl.
CPC .......... *H04W 48/12* (2013.01); *H04B 17/309* (2015.01); *H04W 76/27* (2018.02)

(58) Field of Classification Search
None
See application file for complete search history.

(56) References Cited

U.S. PATENT DOCUMENTS

| 8,160,638 B2 * | 4/2012 | Salowey | ........... H04W 52/0258 |
| | | | 455/552.1 |
| 9,420,635 B2 * | 8/2016 | Zhao | ..................... H04W 24/02 |

(Continued)

FOREIGN PATENT DOCUMENTS

| CN | 105580488 A | 5/2016 |
| CN | 106376033 A | 2/2017 |

(Continued)

OTHER PUBLICATIONS

3GPP TSG RAN Meeting #72; RP-161303; Busan, Korea, Jun. 13-16, 2016; Source: Qualcomm Incorporated, Intel, Huawei, HiSilicon, LG Electronics Inc.; Title:Revision of SI: Further Enhancements LTE Device to Device, UE to Network Relays for IoT and Wearables; Document for: Approval; Agenda Item: 10.6.12.

(Continued)

*Primary Examiner* — Duc T Duong
(74) *Attorney, Agent, or Firm* — Young Basile Hanlon & MacFarlane, P.C.

(57) ABSTRACT

A method for transmitting data, a terminal device and a network device are provided. The method includes: generating, by a network device, indication information, wherein the indication information is used for indicating at least one of the following: a first interface, a type of the first interface, a criterion for determining the type of the first interface, and a criterion for determining the first interface under at least one interface type; and sending, by the network device, the indication information to the terminal device, so that the terminal device enters or remains in an idle state under the first interface according to the indication information.

16 Claims, 3 Drawing Sheets

(51) Int. Cl.
*H04B 17/309* (2015.01)
*H04W 48/12* (2009.01)

(56) References Cited

U.S. PATENT DOCUMENTS

| | | | |
|---|---|---|---|
| 2012/0069827 A1* | 3/2012 | Lee | H04W 52/0274 370/338 |
| 2013/0044590 A1* | 2/2013 | Lee | H04W 76/38 370/328 |
| 2013/0064173 A1* | 3/2013 | Sivavakeesar | H04B 7/2606 370/315 |
| 2014/0098789 A1* | 4/2014 | Liu | H04W 76/10 370/331 |
| 2014/0254565 A1* | 9/2014 | Pitchaiah | H04W 72/1215 370/336 |
| 2015/0327167 A1* | 11/2015 | Ljung | H04W 76/28 370/311 |
| 2017/0034751 A1 | 2/2017 | Fujishiro et al. | |
| 2017/0086081 A1 | 3/2017 | Kim et al. | |
| 2017/0150490 A1* | 5/2017 | Chen | H04W 88/06 |
| 2017/0230958 A1* | 8/2017 | Lee | H04W 76/14 |
| 2017/0325102 A1* | 11/2017 | Casebolt | H04L 61/6022 |
| 2018/0092017 A1* | 3/2018 | Freda | H04W 36/36 |
| 2018/0098370 A1* | 4/2018 | Bangolae | H04W 88/04 |
| 2018/0124674 A1* | 5/2018 | Vutukuri | H04W 36/30 |
| 2018/0317066 A1* | 11/2018 | Xu | H04W 4/46 |
| 2019/0090173 A1* | 3/2019 | Xiao | H04W 40/12 |
| 2019/0098691 A1* | 3/2019 | Yu | H04W 76/28 |
| 2019/0124669 A1* | 4/2019 | Luo | H04W 4/027 |
| 2019/0150057 A1* | 5/2019 | Wang | H04W 36/0069 370/311 |
| 2019/0230654 A1* | 7/2019 | Luo | H04W 72/0413 |
| 2019/0288908 A1* | 9/2019 | Lee | H04L 41/5003 |
| 2020/0260511 A1* | 8/2020 | Kim | H04W 76/14 |

FOREIGN PATENT DOCUMENTS

| | | |
|---|---|---|
| CN | 106507504 A | 3/2017 |
| WO | 2011147446 A1 | 12/2011 |
| WO | 2016162722 A1 | 10/2016 |
| WO | 2017039735 A1 | 3/2017 |
| WO | 2017051494 A1 | 3/2017 |

OTHER PUBLICATIONS

3GPP TSG-RAN WG2 Meeting #91; R2-153403; Procedure of Relay-UE selection and reselection; pp. 1-4; Beijing, China, Aug. 24-28, 2015.
European Search Report for European Application No. 17906900.0 dated Jan. 22, 2020.
Communication pursuant to Article 94(3) EPC for EP Application 17906900.0 dated May 25, 2021. (6 pages).
Japanese Office Action with English Translation for JP Application 2019-556316 dated May 18, 2021. (6 pages).
Korea Office Action with English Translation for KR Application 10-2019-7032850 dated Jan. 28, 2021. (8 pages).
India First Examination Report for IN Application 201917044996 dated Feb. 22, 2021. (6 pages).
Korean Office Action with English Translation for KR Application 1020197032850 dated Aug. 13, 2021. (6 pages).
Korean Notice of Allowance with English Translation for KR Application 1020197032850 dated Oct. 13, 2021. (4 pages).
Japanese Office Action with English Translation for JP Application 2019556316 dated Jan. 28, 2022. (6 pages).

* cited by examiner

DATA TRANSMISSION METHOD, TERMINAL APPARATUS, AND NETWORK APPARATUS

CROSS-REFERENCE TO RELATED APPLICATION(S)

This application is a 371 application of International Application No. PCT/CN2017/082413, filed on Apr. 28, 2017, the entire disclosure of which is hereby incorporated by reference.

TECHNICAL FIELD

Implementations of the present disclosure relate to the field of communication, and more particularly, to a method for transmitting data, a terminal device and a network device.

BACKGROUND

In a Long Term Evolution (LTE) technology, a connection of Radio Resource Control (RRC) can be explicitly or implicitly released, wherein explicit release signaling is RRC Connection Release signaling, which is sent from a base station (eNB) to a User Equipment (UE), and a triggering condition thereof can be deterioration of channel conditions or termination of a current session.

However, there may be multiple interfaces when a terminal performs communication, so how to select an appropriate interface to enter or remain in an idle state when the terminal device performs RRC connection release is a problem to be solved.

SUMMARY

In implementations of the present disclosure, a method for transmitting data, a terminal device and a network device are provided.

In a first aspect, a method for transmitting data is provided, including: generating, by a network device, indication information, wherein the indication information is used for indicating at least one of the following: a first interface, a type of the first interface, a criterion for determining the first interface under at least one type, and a criterion for determining the type of the first interface; and sending, by the network device, the indication information to a terminal device so that the terminal device enters or remains in an idle state under the first interface according to the indication information.

In some possible implementations, the indication information is also used for indicating a second interface for the terminal device in a connected state to switch from the connected state to an idle state.

In some possible implementations, the terminal device is configured with at least one Uu interface and/or at least one PC5 interface.

In implementations of the present disclosure, the terminal device can be enabled to enter or remain in an idle state under the Uu interface or the PC5 interface through the indication information sent by the network device.

In some possible implementations, the indication information is used for indicating any one of the following: the type of the first interface is Uu type; the type of the first interface is PC5 type; and the types of the first interface are Uu type and PC5 type.

In some possible implementations, the criterion includes an interface parameter threshold value, wherein the interface parameter threshold value is a Reference Signal Receiving Power (RSRP) threshold value or a Reference Signal Receiving Quality (RSRQ) threshold value.

In some possible implementations, the criterion for determining the type of the first interface includes: an interface parameter threshold value or an interface parameter threshold value set for determining the type of the first interface among multiple types.

In some possible implementations, the maximum value of at least one numerical value corresponding to the at least one PC5 interface is a first numerical value, and the maximum value of at least one numerical value corresponding to the at least one Uu interface is a second numerical value; if the first numerical value is greater than or equal to the interface parameter threshold value for determining the type of the first interface, and the second numerical value is less than or equal to the interface parameter threshold value for determining the type of the first interface, then the type of the first interface is PC5 type; if the first numerical value is greater than or equal to the interface parameter threshold value for determining the type of the first interface, and the second numerical value is less than or equal to the interface parameter threshold value for determining the type of the first interface, then the type of the first interface is Uu type; if the first numerical value is greater than or equal to the interface parameter threshold value for determining the type of the first interface, and the second numerical value is greater than or equal to the interface parameter threshold value for determining the type of the first interface, then the type of the first interface is the type of the interface corresponding to the maximum value among the first numerical value and the second numerical value.

In some possible implementations, the interface parameter threshold value set for determining the type of the first interface includes: a first interface parameter threshold value and a second interface parameter threshold value corresponding to PC5 type, and a third interface parameter threshold value and a fourth interface parameter threshold value corresponding to Uu type, wherein the first interface parameter threshold value is greater than the second interface parameter threshold value, and the third interface parameter threshold value is greater than the fourth interface parameter threshold value.

In some possible implementations, the maximum value of at least one numerical value corresponding to the at least one PC5 interface is a first numerical value, and the maximum value of at least one numerical value corresponding to the at least one Uu interface is a second numerical value; if the first numerical value is greater than or equal to the first interface parameter threshold value and the second numerical value is less than or equal to the fourth interface parameter threshold value, then the type of the first interface is PC5 type; if the first numerical value is less than or equal to the second interface parameter threshold value and the second numerical value is greater than or equal to the third interface parameter threshold value, then the type of the first interface is Uu type; if the first numerical value is greater than or equal to the first interface parameter threshold value and the second numerical value is greater than or equal to the third interface parameter threshold value, then the type of the first interface is the type of the interface corresponding to the maximum value among the first numerical value and the second numerical value.

In some possible implementations, the multiple types include: an interface type between the terminal device and the network device and an interface type between the terminal device and another terminal device.

In some possible implementations, the multiple interface types include Uu type and PC5 type.

In some possible implementations, the criterion for determining the first interface includes: an interface parameter threshold value for determining the first interface in multiple interfaces of a first type.

In some possible implementations, the first type is PC5 type.

In some possible implementations, an interface parameter of the first interface is greater than or equal to the interface parameter threshold value for determining the first interface.

In some possible implementations, the indication information is used for indicating that the first interface is an interface meeting at least one of the following conditions: a specific type of interface under a specific frequency, an interface under a specific Radio Access Type (RAT), an interface under a specific cell, a PC5 interface under a specific tracking area, and a PC5 interface under a specific address label.

In some possible implementations, the specific type is PC5 type.

In some possible implementations, before generating, by the network device, the indication information, the method further includes: receiving, by the network device, a measurement report sent by the terminal device, wherein the measurement report includes measurement results of the terminal device on at least one PC5 interface and at least one Uu interface; generating, by the network device, the indication information according to the measurement report.

In some possible implementations, the criterion for determining the first interface under at least one type includes an offset threshold value, and the criterion is used for indicating the terminal device to switch to the first interface when a difference between an interface parameter of the first interface and an interface parameter of a current interface is greater than or equal to the offset threshold value.

In a second aspect, a method for transmitting data is provided, including: receiving, by a terminal device, indication information sent by a network device, wherein the indication information is used for indicating at least one of the following: a first interface, a type of the first interface, a criterion for determining the first interface under at least one type, and a criterion for determining the type of the first interface; and entering or remaining in, by the terminal device, an idle state under the first interface according to the indication information.

In some possible implementations, the indication information is also used for indicating a second interface for the terminal device in a connected state to switch to an idle state.

In some possible implementations, the indication information is used for indicating any one of the following: the type of the first interface is Uu type; the type of the first interface is PC5 type; and the types of the first interface are Uu type and PC5 type.

In some possible implementations, the terminal device is configured with at least one Uu interface and/or at least one PC5 interface.

In some possible implementations, entering or remaining in, by the terminal device, an idle state under the first interface according to the indication information, includes: determining, by the terminal device, the first interface in the at least one Uu interface and/or the at least one PC5 interface according to the indication information; and entering or remaining in, by the terminal device, an idle state under the first interface.

In some possible implementations, determining, by the terminal device, the first interface in the at least one Uu interface and/or the at least one PC5 interface according to the indication information, includes: determining, by the terminal device, the type of the first interface among Uu type and PC5 type according to the indication information; and determining, by the terminal device, the first interface under the type of the first interface.

In some possible implementations, the criterion includes an interface parameter threshold value, wherein the interface parameter threshold value is a Reference Signal Receiving Power (RSRP) threshold value or a Reference Signal Receiving Quality (RSRQ) threshold value.

In some possible implementations, the criterion for determining the type of the first interface includes: an interface parameter threshold value or an interface parameter threshold value set for determining the type of the first interface among multiple types.

In some possible implementations, determining, by the terminal device, the type of the first interface among Uu type and PC5 type according to the indication information, includes: determining, by the terminal device, the maximum value in at least one numerical value corresponding to the at least one PC5 interface as a first numerical value; determining, by the terminal device, the maximum value in at least one numerical value corresponding to the at least one Uu interface as a second numerical value; if the first numerical value is greater than or equal to the interface parameter threshold value for determining the type of the first interface, and the second numerical value is less than or equal to the interface parameter threshold value for determining the type of the first interface, determining, by the terminal device, that the type of the first interface is PC5 type; if the first numerical value is greater than or equal to the interface parameter threshold value for determining the type of the first interface, and the second numerical value is less than or equal to the interface parameter threshold value for determining the type of the first interface, determining, by the terminal device, that the type of the first interface is Uu type; and if the first numerical value is greater than or equal to the interface parameter threshold value for determining the type of the first interface, and the second numerical value is greater than or equal to the interface parameter threshold value for determining the type of the first interface, determining, by the terminal device, that the type of the first interface is the type of the interface corresponding to the maximum value among the first numerical value and the second numerical value.

In some possible implementations, the interface parameter threshold value set for determining the type of the first interface includes: a first interface parameter threshold value and a second interface parameter threshold value corresponding to PC5 type, a third interface parameter threshold value and a fourth interface parameter threshold value corresponding to Uu type, wherein the first interface parameter threshold value is greater than the second interface parameter threshold value, and the third interface parameter threshold value is greater than the fourth interface parameter threshold value.

In some possible implementations, determining, by the terminal device, the type of the first interface among Uu type and PC5 type according to the indication information, includes: determining, by the terminal device, the maximum value in at least one numerical value corresponding to the at least one PC5 interface as a first numerical value; determining, by the terminal device, the maximum value in at least one numerical value corresponding to the at least one Uu interface as a second numerical value; if the first numerical value is greater than or equal to the first interface parameter threshold value and the second numerical value is less than or equal to the fourth interface parameter threshold value, determining, by the terminal device, that the type of the first interface is PC5 type; if the first numerical value is less than or equal to the second interface parameter threshold value and the second numerical value is greater than or equal to the third interface parameter threshold value, determining, by the terminal device, that the type of the first interface is Uu type; and if the first numerical value is greater than or equal to the first interface parameter threshold value and the second numerical value is greater than or equal to the third interface parameter threshold value, determining, by the terminal device, that the type of the first interface is the type of the interface corresponding to the maximum value among the first numerical value and the second numerical value.

In some possible implementations, the multiple types include: an interface type between the terminal device and the network device and an interface type between the terminal device and another terminal device.

In some possible implementations, the multiple interface types include Uu type and PC5 type.

In some possible implementations, the criterion for determining the first interface includes: an interface parameter threshold value for determining the first interface in multiple interfaces of a first type.

In some possible implementations, the first type is PC5 type.

In some possible implementations, determining, by the terminal device, the first interface under the type of the first interface, includes: determining, by the terminal device, an interface corresponding to a numerical value greater than or equal to the interface parameter threshold value for determining the first interface as the first interface.

In some possible implementations, the indication information is used for indicating that the first interface is an interface satisfying at least one of the following conditions: a specific type of interface under a specific frequency, an interface under a specific Radio Access Type (RAT), an interface under a specific cell, a PC5 interface under a specific tracking area, and a PC5 interface under a specific address label.

In some possible implementations, the specific type is PC5 type.

In some possible implementations, before receiving, by the terminal device, the first indication information sent by the network device, the method further includes: sending, by the terminal device, a measurement report to the network device, wherein the measurement report includes measurement results of the terminal device on the at least one PC5 interface and the at least one Uu interface.

In some possible implementations, the criterion for determining the first interface under at least one type includes an offset threshold value, and the criterion is used for indicating the terminal device to switch to the first interface when a difference between an interface parameter of the first interface and an interface parameter of a current interface is greater than or equal to the offset threshold value.

In a third aspect, a network device is provided, including: a processing unit, used for generating indication information, wherein the indication information is used for indicating at least one of the following: a first interface, a type of the first interface, a criterion for determining the first interface under at least one type, and a criterion for determining the type of the first interface; a transceiving unit, used for sending the indication information to the terminal device, so that the terminal device enters or remains in an idle state under the first interface according to the indication information.

In a fourth aspect, a network device is provided, including: a processor, used for generating indication information, wherein the indication information is used for indicating at least one of the following: a first interface, a type of the first interface, a criterion for determining the first interface under at least one type, and a criterion for determining the type of the first interface; and a transceiver, used for sending the indication information to the terminal device, so that the terminal device enters or remains in an idle state under the first interface according to the indication information.

In a fifth aspect, a terminal device is provided, including: a transceiving unit, used for receiving indication information sent by a network device, wherein the indication information is used for indicating at least one of the following: a first interface, a type of the first interface, criterion for determining the first interface under at least one type, and criterion for determining the type of the first interface; and a processing unit, used for entering or remaining in an idle state under the first interface according to the indication information.

In a sixth aspect, a terminal device is provided, including: a transceiver, used for receiving indication information sent by a network device, wherein the indication information is used for indicating at least one of the following: a first interface, a type of the first interface, a criterion for determining the first interface under at least one type, and a criterion for determining the type of the first interface; and a processor, used for entering or remaining in an idle state under the first interface according to the indication information.

In a seventh aspect, a computer-readable storage medium is provided, wherein the computer-readable storage medium stores a program which causes a network device to perform a method in the above-mentioned first aspect and any possible implementation thereof.

In an eighth aspect, a computer-readable storage medium is provided, wherein the computer-readable storage medium stores a program which causes a terminal device to perform a method in the above-mentioned second aspect and any possible implementation thereof.

In a ninth aspect, a computer program product including instructions is provided, wherein when being executed on a computer, the computer program product causes the computer to perform the methods described in the above-mentioned various aspects.

DETAILED DESCRIPTION

Technical solutions in implementations of the present disclosure will be described with reference to the accompanying drawings.

Figure 1:
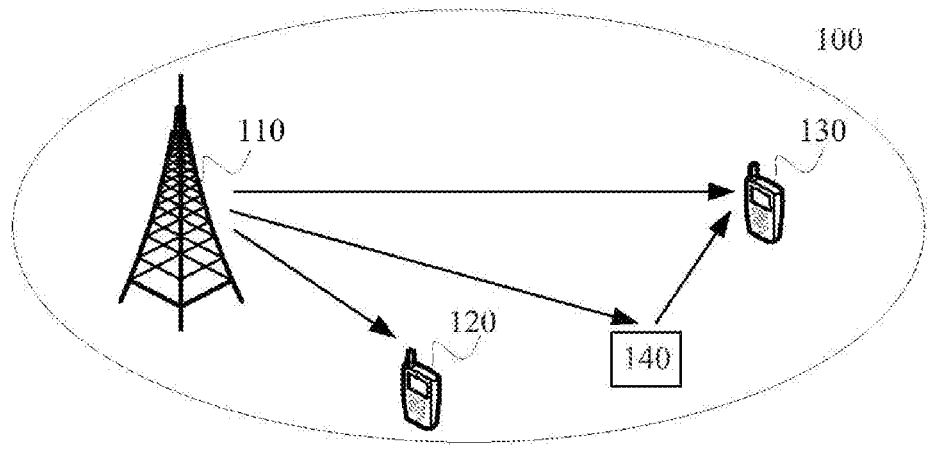
FIG. 1 is an example diagram of a network structure according to an implementation of the present disclosure.

FIG. 1 is a schematic diagram of a network structure according to an implementation of the present disclosure.

As shown in FIG. 1, the communication system 100 may include a network device 110, a terminal device 120, a terminal device 130, and a relay device 140. Herein, the network device 110 may directly communicate with the terminal device 120 through an air interface, but the network device 110 needs to communicate with the terminal device 130 through the relay device 140.

Without loss of generality, the link between the terminal device 130 and the relay device 140 is an access link, the link between the relay device 140 and the network device 110 is a relay link, and the link between the network device 110 and the terminal device 120, and the link between the network device 110 and the terminal device 130 are direct links.

It should be understood that the network structure 100 is only an example for describing implementations of the present disclosure. However, implementations of the present disclosure are not limited to this. That is to say, the present disclosure is applicable to any of a system, a network device and a terminal device that requires the terminal device to switch in a Uu direct connection and a PC5 relay.

For example, technical solutions of implementations of the present disclosure may be applied to various communication systems, including but not limited to: a Global System of Mobile Communication (GSM), a Code Division Multiple Access (CDMA) system, a Wideband Code Division Multiple Access (WCDMA) system, a General Packet Radio Service (GPRS) system, a Long Term Evolution (LTE) system, LTE Time Division Duplex (TDD) system, a Universal Mobile Telecommunication System (UMTS), etc.

The network device 110 may refer to an entity on the network side for transmitting or receiving signals, for example, it may be a user equipment of Machine Type Communication (MTC), a Base Transceiver Station (BTS) in GSM or CDMA, a NodeB in WCDMA, an Evolution Node B (eNB or NodeB) in LTE, a base station device in a 5G network, etc.

Besides, the terminal device 120 and the terminal device 130 may communicate with one or more core networks through a Radio Access Network (RAN), and may also be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

Figure 2:
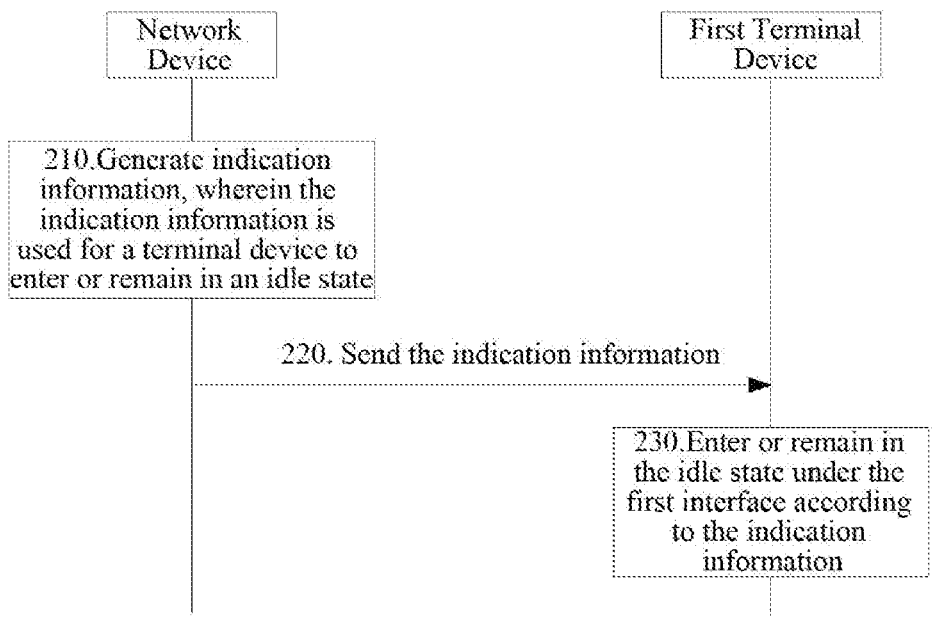
FIG. 2 is a schematic flowchart of a method for transmitting data according to an implementation of the present disclosure.

FIG. 2 is a schematic flowchart of a method 200 for transmitting data according to an implementation of the present disclosure.

As shown in FIG. 2, the method 200 includes acts S210 and S220.

In 210, indication information is generated, wherein the indication information is used for a terminal device to enter or remain in an idle state.

Specifically, a network device generates indication information, wherein the indication information is used for indicating at least one of the following: a first interface, a type of the first interface, a criterion for determining the first interface, and a criterion for determining the type of the first interface.

For example, the indication information may be used for indicating the type of the first interface and the criterion for determining the type of the first interface.

For another example, the indication information may be used for indicating the criterion for determining the first interface and the criterion for determining the type of the first interface.

For another example, the indication information may be used for indicating the type of the first interface, the criterion for determining the first interface, and the criterion for determining the type of the first interface, at the same time.

For another example, the indication information may be used for indicating the first interface under which the terminal device enters or remains in an idle state. Specifically, if the terminal device can only enter or remain in an idle state under a specific interface, the network device can directly indicate the first interface to the terminal device through the indication information.

In other words, the indication information in an implementation of the present disclosure can directly indicate under which interface the terminal device enters or remains in an idle state, or can directly indicate under which type of interface the terminal device enters or remains in an idle state, or can indicate some criteria to the terminal device, so that the terminal device can determine the type of interface under which the terminal device enters or remains in an idle state according to these criteria.

In an implementation of the present disclosure, the terminal device is indicated to be able to select an appropriate interface to enter or remain in an idle state through the indication information sent by the network device.

It should be noted that in an implementation of the present disclosure, after the terminal device determines the first interface according to the indication information, the terminal device in an connected state can switch from the connected state to an idle state under the first interface, and the terminal device in an idle state can switch from the idle state under other interfaces to an idle state under the first interface. The particular details are not limited by implementations of the present disclosure.

Specifically, when the terminal device is in an idle state, the optimal interface for remaining in the idle state is likely to change during a moving process, so the terminal device can re-determine an interface according to the indication information in an implementation of the present disclosure and switch the interface in the idle state, and thus can effectively ensure a signal quality.

It should also be noted that the above-mentioned indication information is only an exemplary description, and implementations of the present disclosure are not limited thereto.

For example, the indication information is used for indicating that the first interface is an interface meeting at least one of the following conditions: a specific type of interface under a specific frequency, an interface under a specific Radio Access Type (RAT), an interface under a specific cell, a specific type of interface under a specific tracking area, and a specific type of interface under a specific address label.

Optionally, the specific type is PC5 type.

It can be understood that the terminal device in an implementation of the present disclosure may be configured with at least one Uu interface and/or at least one PC5 interface.

Optionally, in an implementation of the present disclosure, before the network device generates the indication information, the network device may receive a measurement report sent by the terminal device, wherein the measurement report includes measurement results of the terminal device on the above-mentioned at least one PC5 interface and the above-mentioned at least one Uu interface; and the network device generates the indication information according to the received measurement report.

It should be understood that the network device in implementations of the present disclosure may generate the indication information based on the measurement report, or may directly generate the indication information according to the situation of service transmission with the terminal device. Implementations of the present disclosure are not specifically limited.

The following is an exemplary explanation of the implementation of the indication information for indicating the type of the first interface.

Optionally, as an implementation, the indication information is used for indicating that the type of the first interface is Uu type or PC5 type. At this time, the terminal device may directly determine the type of the first interface according to the indication information.

Specifically, the indication information is used for indicating any one of the following: the type of the first interface is Uu type; the type of the first interface is PC5 type; and the types of the first interface are Uu type and PC5 type.

It should be understood that in an implementation of the present disclosure, Uu type or PC5 type may be called as another name, and implementations of the present disclosure only define functions of these two types of interfaces. For example, Uu type refers to an interface between a terminal device and a network device, and PC5 type refers to an interface between a terminal device and another terminal device. That is to say, the interface between a terminal device and another terminal device may also be an interface of a non-Uu type and the interface between a terminal device and a network device may also be an interface of a non-PC5 type, without departing from the technical solutions of implementations of the present disclosure.

Optionally, as another implementation, the criterion for determining the type of the first interface includes: an interface parameter threshold value or an interface parameter threshold value set for determining the type of the first interface among multiple types.

Optionally, the multiple types include: an interface type between the terminal device and the network device and an interface type between the terminal device and another terminal device.

The following description will take the multiple types including the PC5 type and Uu type as an example.

In the PC5 type and Uu type, an interface parameter threshold value or an interface parameter threshold value set for determining the type of the first interface is provided. At this time, the terminal device needs to determine the type of the first interface according to the interface parameter threshold value or the interface parameter threshold value set for determining the type of the first interface.

For example, when the criterion for determining the type of the first interface includes an interface parameter threshold value for determining the type of the first interface, specifically, the terminal device determines the maximum value in at least one numerical value corresponding to at least one PC5 interface as a first numerical value. The terminal device determines the maximum value in at least one numerical value corresponding to at least one Uu interface as a second numerical value. Optionally, if the first numerical value is greater than or equal to the interface parameter threshold value for determining the type of the first interface, and the second numerical value is less than or equal to the interface parameter threshold value for determining the type of the first interface, the terminal device determines that the type of the first interface is PC5 type. Optionally, if the first numerical value is less than or equal to the interface parameter threshold value for determining the type of the first interface, and the second numerical value is greater than or equal to the interface parameter threshold value for determining the type of the first interface, the terminal device determines that the type of the first interface is Uu type. Optionally, if the first numerical value is greater than or equal to the interface parameter threshold value for determining the type of the first interface and the second numerical value is greater than or equal to the interface parameter threshold value for determining the type of the first interface, the terminal device determines that the type of the first interface is the type of the interface corresponding to the maximum value among the first numerical value and the second numerical value.

For another example, the interface parameter threshold value set for determining the type of the first interface includes: a first interface parameter threshold value and a second interface parameter threshold value corresponding to the PC5 type, a third interface parameter threshold value and a fourth interface parameter threshold value corresponding to the Uu type, wherein the first interface parameter threshold value is greater than the second interface parameter threshold value, and the third interface parameter threshold value is greater than the fourth interface parameter threshold value.

Specifically, the terminal device determines the maximum value in at least one numerical value corresponding to at least one PC5 interface as a first numerical value; the terminal device determines the maximum value in at least one numerical value corresponding to at least one Uu interface as a second numerical value. Optionally, if the first numerical value is greater than or equal to the first interface parameter threshold value and the second numerical value is less than or equal to the fourth interface parameter threshold value, the terminal device determines that the type of the first interface is PC5 type. Optionally, if the first numerical value is less than or equal to the second interface parameter threshold value and the second numerical value is greater than or equal to the third interface parameter threshold value, the terminal device determines that the type of the first interface is Uu type. Optionally, if the first numerical value is greater than or equal to the first interface parameter threshold value and the second numerical value is greater than or equal to the third interface parameter threshold value, the terminal device determines that the type of the first interface is the type of the interface corresponding to the maximum value among the first numerical value and the second numerical value.

It should be noted that the implementation of the present disclosure provides only examples of the case where the interface parameter threshold value or the interface parameter threshold value set for determining the type of the first interface includes four specific interface parameter threshold values, and implementations of the present disclosure are not limited thereto.

For example, in an implementation of the present disclosure, the threshold set for determining the type of the first interface may include six thresholds, wherein the PC5 type corresponds to three interface parameter threshold values, and the Uu type corresponds to three interface parameter threshold values, or the like.

It should also be understood that in an implementation of the present disclosure, after receiving the interface parameter threshold value or the interface parameter threshold value set for determining the type of the first interface sent by the network device, the specific rule, with which the terminal device determines the type of the first interface according to the interface parameter threshold value or the interface parameter threshold value set for determining the type of the first interface, may be pre-configured or sent by the network device to the terminal device, and implementations of the present disclosure are not specifically limited thereto.

Optionally, in an implementation of the present disclosure, the first numerical value is Reference Signal Receiving Power (RSRP) or Reference Signal Receiving Quality (RSRQ), and the second numerical value is RSRP or RSRQ.

The implementation of the indication information for indicating the first interface is illustratively explained in the following.

Optionally, as an implementation, the indication information is used for indicating the first interface. At this time, the terminal device may directly enter or remain in an idle state on the indicated first interface.

Optionally, as another implementation, the criterion for determining the first interface includes: an interface parameter threshold value for determining the first interface among multiple interfaces of a first type.

That the first type is PC5 type is illustratively explained in the following.

In other words, the terminal device determines the interface corresponding to the numerical value which is greater than or equal to the interface parameter threshold value for determining the first interface as the first interface.

In 220, the indication information is sent.

Specifically, the network device sends the indication information to the terminal device, so that the terminal device enters or remains in the idle state under the first interface according to the indication information.

Optionally, the network device sends RRC Connection Release signaling to the terminal device, wherein the RRC connection release signaling includes the indication information.

In 230, the idle state under the first interface is entered or remained in according to the indication information.

Specifically, after receiving the indication information sent by the network device, the terminal device enters or remains in the idle state under the first interface according to the indication information.

Optionally, the terminal device is configured with at least one Uu interface and/or at least one PC5 interface. The terminal device determines the first interface in the above-mentioned at least one Uu interface and/or the above-mentioned at least one PC5 interface according to the indication information. The terminal device enters or remains in the idle state under the first interface.

More specifically, the terminal device determines the type of the first interface among the Uu type and PC5 type according to the indication information, and the terminal device determines the first interface under the type of the first interface.

It should be understood that the indication information in the implementation of the present disclosure may be used for indicating an offset interface parameter threshold value, wherein the offset interface parameter threshold value is used for the terminal device to replace the first interface.

Specifically, the criterion for determining the first interface under at least one type includes an offset threshold value, and the criterion is used for indicating the terminal device to switch to the first interface when a difference between an interface parameter of the first interface and an interface parameter of the current interface is greater than or equal to the offset threshold value.

In other words, after the terminal device switches from the connected state to the idle state under the first interface, after a period of time, a numerical value of a second interface of the terminal device is greater than the numerical value corresponding to the first interface. At this time, the terminal device needs to determine whether to switch from the idle state under the first interface to an idle state under the second interface according to the offset interface parameter threshold value.

Figure 3:
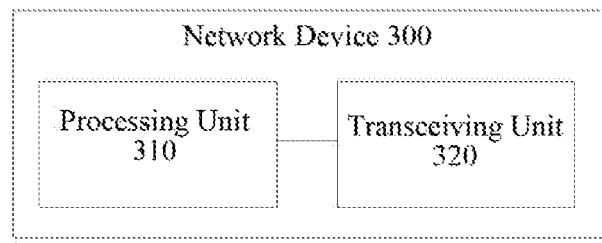
FIG. 3 is a schematic block diagram of a network device according to an implementation of the present disclosure.

FIG. 3 is a schematic diagram of an information network device 300 according to an implementation of the present disclosure.

As shown in FIG. 3, the network device 300 includes: a processing unit 310, used for generating indication information, wherein the indication information is used for indicating at least one of the following: a first interface, a type of the first interface, a criterion for determining the first interface, and a criterion for determining the type of the first interface; and a transceiving unit 320, used for sending the indication information to the terminal device, so that the terminal device enters or remains in an idle state under the first interface according to the indication information.

Optionally, the terminal device is configured with at least one Uu interface and/or at least one PC5 interface.

Optionally, the indication information is used for indicating any one of the following: the type of the first interface is Uu type; the type of the first interface is PC5 type; and the types of the first interface are Uu type and PC5 type.

Optionally, the criterion includes an interface parameter threshold value, wherein the interface parameter threshold value is a Reference Signal Receiving Power (RSRP) threshold value or a Reference Signal Receiving Quality (RSRQ) threshold value.

Optionally, the criterion for determining the type of the first interface includes: an interface parameter threshold value or an interface parameter threshold value set for determining the type of the first interface among multiple types.

Optionally, the multiple types include: an interface type between the terminal device and the network device and an interface type between the terminal device and another terminal device.

Optionally, the multiple interface types include Uu type and PC5 type.

Optionally, the maximum value of at least one numerical value corresponding to the above-mentioned at least one PC5 interface is a first numerical value, and the maximum value of at least one numerical value corresponding to the above-mentioned at least one Uu interface is a second numerical value. If the first numerical value is greater than or equal to the interface parameter threshold value for determining the type of the first interface, and the second numerical value is less than or equal to the interface parameter threshold value for determining the type of the first interface, then the type of the first interface is PC5 type. If the first numerical value is greater than or equal to the interface parameter threshold value for determining the type of the first interface, and the second numerical value is less than or equal to the interface parameter threshold value for determining the type of the first interface, then the type of the first interface is Uu type. If the first numerical value is greater than or equal to the interface parameter threshold value for determining the type of the first interface and the second numerical value is greater than or equal to the interface parameter threshold value for determining the type of the first interface, then the type of the first interface is the type of the interface corresponding to the maximum value among the first numerical value and the second numerical value.

Optionally, the interface parameter threshold value set for determining the type of the first interface includes: a first interface parameter threshold value and a second interface parameter threshold value corresponding to the PC5 type, a third interface parameter threshold value and a fourth interface parameter threshold value corresponding to the Uu type, wherein the first interface parameter threshold value is greater than the second interface parameter threshold value, and the third interface parameter threshold value is greater than the fourth interface parameter threshold value.

Optionally, the maximum value of at least one numerical value corresponding to the above-mentioned at least one PC5 interface is a first numerical value, and the above-mentioned maximum value of at least one numerical value corresponding to the above-mentioned at least one Uu interface is a second numerical value. If the first numerical value is greater than or equal to the first interface parameter threshold value and the second numerical value is less than or equal to the fourth interface parameter threshold value, then the type of the first interface is PC5 type. If the first numerical value is less than or equal to the second interface parameter threshold value and the second numerical value is greater than or equal to the third interface parameter threshold value, then the type of the first interface is Uu type. If the first numerical value is greater than or equal to the first interface parameter threshold value and the second numerical value is greater than or equal to the third interface parameter threshold value, then the type of the first interface is the type of the interface corresponding to the maximum value among the first numerical value and the second numerical value.

Optionally, the criterion for determining the first interface includes: an interface parameter threshold value for determining the first interface among multiple interfaces of a first type.

Optionally, the first type is PC5 type.

Optionally, the interface parameter of the first interface is greater than or equal to the interface parameter threshold value for determining the first interface.

Optionally, the indication information is used for indicating that the first interface is an interface meeting at least one of the following conditions: a specific type of interface under a specific frequency, an interface under a specific Radio Access Type (RAT), an interface under a specific cell, a PC5 interface under a specific tracking area, and a PC5 interface under a specific address label.

Optionally, the specific type is PC5 type.

Optionally, before the network device generates the indication information, the transceiving unit 320 is further used for: receiving a measurement report sent by the terminal device, wherein the measurement report includes measurement results of the terminal device on the above-mentioned at least one PC5 interface and the above-mentioned at least one Uu interface; wherein, the processing unit 310 is used for: generating the indication information according to the measurement report.

Optionally, the criterion for determining the first interface under at least one type includes an offset threshold value, and the criterion is used for indicating the terminal device to switch to the first interface when the difference between the interface parameter of the first interface and the interface parameter of the current interface is greater than or equal to the offset threshold value.

It should be noted that in an implementation of the present disclosure, the processing unit 310 may be implemented by a processor, and the transceiving unit 320 may be implemented by a transceiver.

Figure 4:
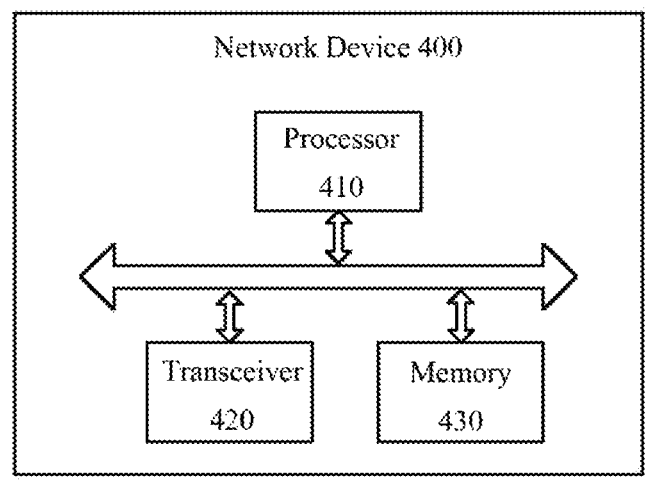
FIG. 4 is another schematic block diagram of a network device according to an implementation of the present disclosure.

As shown in FIG. 4, a network device 400 may include a processor 410, a transceiver 420, and a memory 430. The storage 430 may be used for storing indication information, or may be used for storing codes, instructions, etc., executed by the processor 410.

As an example but not limitation, communication connections are implemented between the processor 410, the transceiver 420, and the memory 430 by an approach such as a bus.

It need to be made clear that the method performed by the processor 410 is consistent with the contents of the aforementioned method implementation and will not be described here.

Figure 5:
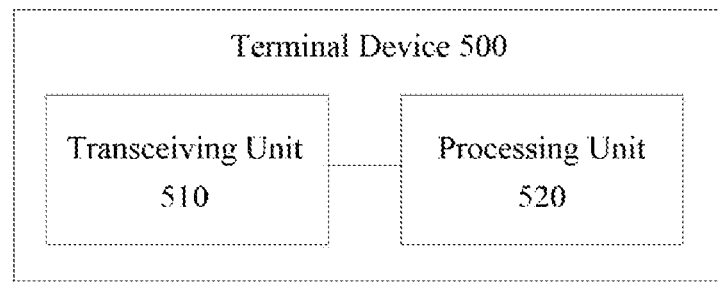
FIG. 5 is a schematic block diagram of a terminal device according to an implementation of the present disclosure.

FIG. 5 is a schematic block diagram of a terminal device 500 according to an implementation of the present disclosure.

As shown in FIG. 5, the terminal device 500 includes a receiving unit 510 and a processing unit 520.

The transceiving unit 510 is used for receiving indication information sent by a network device, wherein the indication information is used for indicating at least one of the following: a first interface, a type of the first interface, a criterion for determining the first interface, and a criterion for determining the type of the first interface; and the processing unit 520 is used for entering or remaining in an idle state under the first interface according to the indication information.

Optionally, the indication information is used for indicating any one of the following: the type of the first interface is Uu type; the type of the first interface is PC5 type; and the types of the first interface are Uu type and PC5 type.

Optionally, the terminal device is configured with at least one Uu interface and/or at least one PC5 interface.

Optionally, the processing unit 520 is specifically used for: determining the first interface in the above-mentioned at least one Uu interface and/or the above-mentioned at least one PC5 interface according to the indication information; entering or remaining in, by the terminal device, an idle state under the first interface.

Optionally, the processing unit 520 is specifically used for: determining the type of the first interface among Uu type and PC5 type, according to the indication information; determining the first interface under the type of the first interface.

Optionally, the criterion includes an interface parameter threshold value, wherein the interface parameter threshold value is a Reference Signal Receiving Power (RSRP) threshold value or a Reference Signal Receiving Quality (RSRQ) threshold value.

Optionally, the criterion for determining the type of the first interface includes: an interface parameter threshold value or an interface parameter threshold value set for determining the type of the first interface among multiple types.

Optionally, the multiple types include: an interface type between the terminal device and the network device and an interface type between the terminal device and another terminal device.

Optionally, the multiple interface types include Uu type and PC5 type.

Optionally, the processing unit 520 is specifically used for: determining the maximum value in at least one numerical value corresponding to the above-mentioned at least one PC5 interface as a first numerical value; determining the maximum value in at least one numerical value corresponding to the above-mentioned at least one Uu interface as a second numerical value; if the first numerical value is greater than or equal to the interface parameter threshold value for determining the type of the first interface, and the second numerical value is less than or equal to the interface parameter threshold value for determining the type of the first interface, determining that the type of the first interface is PC5 type; if the first numerical value is less than or equal to the interface parameter threshold value for determining the type of the first interface, and the second numerical value is greater than or equal to the interface parameter threshold value for determining the type of the first interface, determining that the type of the first interface is Uu type; if the first numerical value is greater than or equal to the interface parameter threshold value for determining the type of the first interface and the second numerical value is greater than or equal to the interface parameter threshold value for determining the type of the first interface, determining the type of the first interface is the type of the interface corresponding to the maximum value among the first numerical value and the second numerical value.

Optionally, the interface parameter threshold value set for determining the type of the first interface includes: a first interface parameter threshold value and a second interface parameter threshold value corresponding to the PC5 type, a third interface parameter threshold value and a fourth interface parameter threshold value corresponding to the Uu type, wherein the first interface parameter threshold value is greater than the second interface parameter threshold value, and the third interface parameter threshold value is greater than the fourth interface parameter threshold value.

Optionally, the processing unit 520 is specifically used for: determining the maximum value in at least one numerical value corresponding to the above-mentioned at least one PC5 interface as a first numerical value; determining the maximum value in at least one numerical value corresponding to the above-mentioned at least one Uu interface as a second numerical value; if the first numerical value is greater than or equal to the first interface parameter threshold value and the second numerical value is less than or equal to the fourth interface parameter threshold value, determining that the type of the first interface is PC5 type; if the first numerical value is less than or equal to the second interface parameter threshold value and the second numerical value is greater than or equal to the third interface parameter threshold value, determining that the type of the first interface is Uu type; if the first numerical value is greater than or equal to the first interface parameter threshold value and the second numerical value is greater than or equal to the third interface parameter threshold value, determining the type of the first interface is the type of the interface corresponding to the maximum value among the first numerical value and the second numerical value.

Optionally, the criterion for determining the first interface includes: an interface parameter threshold value for determining the first interface among multiple PC5 interfaces.

Optionally, the processing unit 520 is specifically used for: determining the interface corresponding to the numerical value which is greater than or equal to the interface parameter threshold value for determining the first interface as the first interface.

Optionally, the indication information is used for indicating that the first interface is an interface meeting at least one of the following conditions: a specific type of interface under a specific frequency, an interface under a specific Radio Access Type (RAT), an interface under a specific cell, a PC5 interface under a specific tracking area, and a PC5 interface under a specific address label.

Optionally, the specific type is PC5 type.

Optionally, before the terminal device receives the indication information sent by the network device, the transceiving unit 510 is further used for: sending, by the terminal device, a measurement report to the network device, wherein the measurement report includes measurement results of the terminal device on the above-mentioned at least one PC5 interface and the above-mentioned at least one Uu interface.

Optionally, the criterion for determining the first interface under at least one type includes an offset threshold value, and the criterion is used for indicating the terminal device to switch to the first interface when the difference between the interface parameter of the first interface and the interface parameter of the current interface is greater than or equal to the offset threshold value.

It should be noted that in an implementation of the present disclosure, the transceiving unit 510 may be implemented by a transceiver, and the processing unit 520 may be implemented by a processor.

Figure 6:
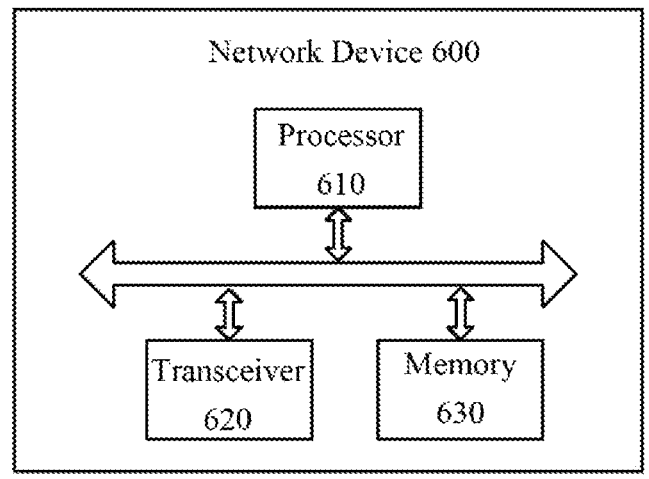
FIG. 6 is another schematic block diagram of a terminal device according to an implementation of the present disclosure.

As shown in FIG. 6, a terminal device 600 may include a processor 610, a transceiver 620, and a memory 630. The storage 630 may be used for storing indication information, or may be used for storing codes, instructions, etc., executed by the processor 610.

As an example but not limitation, communication connections are implemented between the processor 610, the transceiver 620, and the memory 630 by an approach such as a bus.

It need to be made clear that the method performed by the processor 610 is consistent with the contents of the aforementioned method implementation and will not be described here.

It should be noted that the method implementations in implementations of the present disclosure may be applied to a processor or implemented by the processor. The processor may be an integrated circuit chip with signal processing capability. In the implementation process, the actions of the method implementations described above may be completed by integrated logic circuits of hardware in the processor or instructions in the form of software. The above-mentioned processor may be a general purpose processor, a Digital Signal Processor (DSP), an Application Specific Integrated Circuit (ASIC), a Field Programmable Gate Array (FPGA), or other programmable logic devices, transistor logic devices, or discrete hardware component. The disclosed methods, acts and logical block diagrams in implementations of the present disclosure may be implemented or performed. The general purpose processor may be a microprocessor or the processor may be any conventional processor or the like. The acts of the methods disclosed in combination with implementations of the present disclosure may be directly embodied as to be performed and accomplished by a hardware decoding processor or by a combination of hardware and software modules in a decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It can be understood that in an implementation of the present disclosure the memory may be a volatile memory or a non-volatile memory, or it may include both volatile and non-volatile memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. Through exemplary but not restricted explanation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). It should be noted that the memories of the systems and methods described herein are intended to include, but are not limited to, these and any other suitable types of memories.

It should be understood that the terms used in implementations of the present disclosure and the appended claims are for the purpose of describing specific implementations only but are not intended to limit implementations of the present disclosure.

For example, the term "and/or" in implementations of the present disclosure is only an association relation describing associated objects, representing that there can be three kinds of relations. Specifically, A and/or B can represent: three cases of that A exists alone, A and B exist simultaneously, and B exists alone. In addition, the symbol "/" in this document generally indicates that objects before and after the symbol "/" have an "or" relationship.

For another example, the singular forms "a", "said", and "the" used in implementations of the present disclosure and the appended claims are also intended to include the plural forms unless the context clearly represents other meanings.

For another example, the terms first, second, third, etc. may be used to describe various interface parameter threshold values, interfaces, and terminals in implementations of the present disclosure, but these interface parameter threshold values, interfaces, and terminals should not be limited to these terms. These terms are only used to distinguish the interface parameter threshold value, interface and terminal from each other.

For another example, depending on the context, the word "if" or "if" as used herein may be interpreted as "when" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, devices and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely the specific implementations of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

I claim:

1. A method for transmitting data, comprising:
   receiving, by a terminal device, indication information sent by a network device, wherein the indication information is used for indicating the terminal device to determine a first interface to enter or remain in an idle state after receiving a RRC connection release message based on at least one of the following:

the first interface, a type of the first interface, a criterion for determining the type of the first interface, and a criterion for determining the first interface under at least one interface type; wherein the first interface is Uu interface or PC5 interface; or entering or remaining in, by the terminal device, the idle state under the Uu interface or the PC5 interface according to the indication information after the RRC connection release message is received, wherein the criterion for determining the first interface under at least one interface type comprises an offset threshold value, and the criterion is used for indicating the terminal device to switch to the first interface when a difference between an interface parameter of the first interface and an interface parameter of the current interface is greater than or equal to the offset threshold value.

2. The method of claim 1, wherein the indication information is used for indicating any one of the following:

the type of the first interface is Uu type;
the type of the first interface is PC5 type; and
the types of the first interface are Uu type and PC5 type.

3. The method of claim 1, wherein the criterion comprises an interface parameter threshold value, wherein the interface parameter threshold value is a Reference Signal Receiving Power (RSRP) threshold value or a Reference Signal Receiving Quality (RSRQ) threshold value.

4. The method of claim 1, wherein entering or remaining in, by the terminal device, the idle state under the Uu interface or the PC5 interface according to the indication information, comprises:

determining, by the terminal device, the first interface in the at least one Uu interface and/or the at least one PC5 interface according to the indication information; and entering or remaining in, by the terminal device, the idle state under the first interface.

5. The method of claim 4, wherein determining, by the terminal device, the first interface in the at least one Uu interface and/or the at least one PC5 interface according to the indication information, comprises:

determining, by the terminal device, the type of the first interface among Uu type and PC5 type according to the indication information; and determining, by the terminal device, the first interface under the type of the first interface.

6. The method of claim 1, wherein the criterion for determining the type of the first interface comprises:

an interface parameter threshold value or an interface parameter threshold value set for determining the type of the first interface among multiple interface types.

7. The method of claim 6, wherein the multiple interface types comprise: an interface type between the terminal device and the network device and an interface type between the terminal device and another terminal device.

8. The method of claim 6, wherein the multiple interface types comprise Uu type and PC5 type.

9. The method of claim 1, wherein the criterion for determining the first interface under at least one interface type comprises:

an interface parameter threshold value for determining the first interface in multiple interfaces of a first interface type.

10. The method of claim 9, wherein an interface parameter of the first interface is greater than or equal to the interface parameter threshold value for determining the first interface.

11. The method of claim 1, wherein the indication information is used for indicating that the first interface is an interface meeting at least one of the following conditions:

a specific type of interface under a specific frequency, an interface under a specific Radio Access Type (RAT), an interface under a specific cell, the specific type of interface under a specific tracking area, and the specific type of interface under a specific address label.

12. The method of claim 1, wherein the method further comprises:

before receiving, by the terminal device, the indication information sent by the network device, sending, by the terminal device, a measurement report to the network device, wherein the measurement report comprises measurement results of the terminal device on interfaces of multiple interface types.

13. A non-transitory computer-readable storage medium, wherein the computer-readable storage medium stores a program which causes a terminal device to perform the method for transmitting data according to claim 1.

14. A terminal device for transmitting data, comprising:

a transceiver, used for receiving indication information sent by a network device, wherein the indication information is used for indicating the terminal device to determine a first interface to enter or remain in an idle state after receiving a RRC connection release message based on at least one of the following:

the first interface, a type of the first interface, a criterion for determining the type of the first interface, and a criterion for determining the first interface under at least one interface type; wherein the first interface is Uu interface or PC5 interface; or a processor, used for entering or remaining in the idle state under the Uu interface or the PC5 interface according to the indication information after the RRC connection release message is received, wherein the criterion for determining the first interface under at least one interface type comprises an offset threshold value, and the criterion is used for indicating the terminal device to switch to the first interface when a difference between an interface parameter of the first interface and an interface parameter of the current interface is greater than or equal to the offset threshold value.

15. The terminal device according to claim 14, wherein the indication information is used for indicating any one of the following:

the type of the first interface is Uu type;
the type of the first interface is PC5 type; and
the types of the first interface are Uu type and PC5 type.

16. The terminal device according to claim 14, wherein the processor is used for:

determining, the first interface in the at least one Uu interface and/or the at least one PC5 interface according to the indication information; and entering or remaining in, by the terminal device, the idle state under the first interface.

* * * * *